United States Patent [19]
Bridgers et al.

[11] Patent Number: 5,915,262
[45] Date of Patent: *Jun. 22, 1999

[54] CACHE SYSTEM AND METHOD USING TAGGED CACHE LINES FOR MATCHING CACHE STRATEGY TO I/O APPLICATION

[75] Inventors: K. Vincent Bridgers; Michael Drake; Richard W. Schuckle, all of Austin, Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/681,105

[22] Filed: Jul. 22, 1996

[51] Int. Cl.$^6$ .............................. G06F 12/00; G06F 13/00
[52] U.S. Cl. ........................ 711/143; 711/118; 711/129; 711/141; 711/147
[58] Field of Search ...................... 395/456, 460, 395/461, 468, 474; 711/118, 129, 133, 134, 141, 143, 147, 154

[56] References Cited

U.S. PATENT DOCUMENTS

| | | | |
|---|---|---|---|
| 4,905,141 | 2/1990 | Brenza et al. ........................... | 395/456 |
| 5,025,366 | 6/1991 | Baror ...................................... | 711/118 |
| 5,119,485 | 6/1992 | Ledbetter et al. ...................... | 711/118 |

(List continued on next page.)

FOREIGN PATENT DOCUMENTS

| | | |
|---|---|---|
| 0 525 308 | 2/1993 | European Pat. Off. . |
| WO 96 10789 | 4/1996 | WIPO . |

OTHER PUBLICATIONS

Microsoft Support Online, "Windows NT Hardware Abstraction Layer (HAL)", Article ID—Q99588, Jan. 1995.
Helen Custer, "Inside Windows NT", p. 341, 1992.
Allen M.S. et al.: "Multiprocessing Aspects of the PowerPC™ 601", Proceedings of the Spring Computer Society International Conference (COMPCON), San Francisco, Feb. 22–26, 1993, IEEE, pp. 117–126, XP000379037.

Primary Examiner—John W. Cabeca
Assistant Examiner—Tuan V. Thai
Attorney, Agent, or Firm—Skjerven, Morrill, MacPherson, Franklin & Friel LLP; Ken J. Koestner

[57] ABSTRACT

A computer system including a processor, a main memory and a cache memory uses tagging of various regions of memory to define and select caching properties of transfers between the processor and memory via the cache. The main memory contains not only standard random access memory (RAM) and read-only memory (ROM) but also memory-mapped input/output (I/O) sources. Tagging of the memory regions configures the regions for association with a particular set of caching properties. For example, a memory-mapped video I/O buffer may be tagged with a MM_IO_VBUF tag designating the caching properties of write-back cacheability with weak read/write ordering. Low-level operating system software, such as the Hardware Abstraction Language (HAL) interface of the Windows NT™ operating system or device driver software, initialize the memory regions, the cache and make symbolic associations between the memory regions and the cache. The cache, operating as directed by the memory tags, allows read and write operations that are used for performing various types of multimedia or signal processing operations including decompression, drawing operations, compression, mixing, and the like, which are performed on a virtually-cached multimedia drawing surface. The data for performing the multimedia or signal processing operations are either already located on the I/O surface or read from another storage location local to the processor or from an external processor, which is also cached and tagged as a special cached region. The processor executes operations acting on the cached data. When all operations are completely executed by the processor, only the cached memory regions are flushed using a flush instruction such as CFLSH[MM_IO_VBUF]. The flush instruction directs the cache to write back and invalidate the regions having the designated tag, here MM_IO_VBUF.

26 Claims, 8 Drawing Sheets

U.S. PATENT DOCUMENTS

| | | | |
|---|---|---|---|
| 5,136,691 | 8/1992 | Baror | 395/468 |
| 5,233,702 | 8/1993 | Emma et al. | 711/118 |
| 5,235,688 | 8/1993 | Taniguchi et al. | 711/118 |
| 5,257,360 | 10/1993 | Schnizlein et al. | 711/118 |
| 5,297,270 | 3/1994 | Olson | 395/460 |
| 5,353,426 | 10/1994 | Patet et al. | 711/118 |
| 5,353,429 | 8/1993 | Fitch | 711/118 |
| 5,381,539 | 1/1995 | Yanai et al. | 395/456 |
| 5,410,669 | 4/1995 | Biggs et al. | 711/118 |
| 5,414,828 | 5/1995 | Yarkoni et al. | 711/118 |
| 5,428,761 | 6/1995 | Herlihy et al. | 711/130 |
| 5,469,555 | 11/1995 | Ghosh et al. | 395/460 |
| 5,487,162 | 1/1996 | Tanaka et al. | |
| 5,524,212 | 6/1996 | Somani et al. | 395/200.08 |
| 5,627,992 | 5/1997 | Baror | 395/460 |
| 5,649,153 | 7/1997 | McNutt et al. | 395/445 |

CACHE SYSTEM AND METHOD USING TAGGED CACHE LINES FOR MATCHING CACHE STRATEGY TO I/O APPLICATION

BACKGROUND OF THE INVENTION

1. Field of the Invention

The present invention relates to computer systems. More specifically, the invention relates to a cache memory and method of operating a cache memory in a computer system.

2. Description of the Related Art

A cache memory is a high-speed memory array which acts as a buffer between a CPU and a main memory of a computer system. A cache memory is effective because most software repeatedly executes the same instructions or manipulates data in the same spatial location in the memory. A cache memory increases effective memory speed by accessing slower main memory only once to fetch instructions or data with subsequent executions operating from the faster cache memory. A cache memory includes a data memory, a controller, and a directory.

The cache memory controls the CPU. If the cache memory includes a valid copy of data requested by the CPU during a CPU read cycle, then the cache allows the CPU to operate at the speed of the cache. If the cache does not contain a copy of the data, then the cache initiates a main memory read cycle, copies the data supplied by the main memory which the main memory indicates is valid using a ready signal, and allows the CPU to continue operating. Data applied to the CPU is routed by the cache controller either from the cache for the case of a cache hit or from buffers that isolate the main memory from the CPU for a cache miss. The cache hit results in no wait states. For the cache miss, the cache controller disables a memory ready signal so that the CPU inserts wait states. The cache memory performs this control function by intercepting all signals from the CPU, including input signals and output signals, thereby isolating the CPU from other devices.

Generally, when a cache miss occurs, not only the requested data bytes but also a complete cache line is read from the main memory into the cache memory in an operation called a cache line fill. A cache line typically includes 16 or 32 bytes. The cache line fill replaces a line in the cache. Data that is changed while in the cache is written to memory prior to replacement. One technique for writing changed cache data to memory is a write-through technique in which a write operation of the CPU causes a data transfer to main memory both for cache hits and cache misses. The write-through technique advantageously ensures consistency of the main memory, if only for single-processor systems. The write-through technique disadvantageously causes wait states.

An alternative technique for writing changed cache data to memory is a write-back cache technique in which all write operations are collected and the main memory is only updated upon receipt of an explicit update command or inquiry. One example of such a command is a software "write-back and invalidate data cache" (WBINVD) instruction. Another example of such a command is a hardware FLUSH signal which occurs implicitly as the result of a cache miss. The disadvantage of the write-back cache is that the exchange of cache lines has a longer duration because data must be written into memory before new data is read into the CPU.

A further alternative technique is a write-allocate technique in which a the cache controller implements a write-allocate strategy by filling the cache space for a cache line with the data for the address to be written. Usually, the data is first written through to the memory. The cache controller then reads the applicable cache line with the entry to be updated into the cache. The data is written through so that the CPU can restart program execution. The cache controller independently performs the write-allocate in parallel with the CPU operation.

With the advent of multimedia computer systems, a wide variety of data flows, data volumes and data characteristics are handled by caches. Multimedia computers access data in the forms of video data flows, audio data flows, video frames and the like, in addition to conventional handling of data and instructions. Caching characteristics of the different data flows are substantially different. For example, video data may flow through a cache memory while undergoing recursive processing in which the same data is processed periodically. The video data quickly is replaced due to the large volumes of data that is processed. The same data then must be brought back into the cache for recursive processing. This processes constantly repeats causing considerable thrashing of the cache memory.

Similarly, audio data typically involves smaller data volumes but is most efficiently handled using cache strategies that are different from strategies used for handling video data, conventional data or operating instructions.

What is needed is an apparatus and method for controlling the caching of different types of data which effectively considers the characteristics of the various data types.

SUMMARY OF THE INVENTION

In accordance with the present invention, a computer system including a processor, a main memory and a cache memory uses tagging of various regions of memory to define and select caching properties of transfers between the processor and memory via the cache. The main memory contains not only standard random access memory (RAM) and read-only memory (ROM) but also memory-mapped input/output (I/O) sources. Tagging of the memory regions configures the regions for association with a particular set of caching properties. The caching properties are tagged according to the character of the data, in terms of data locality, the volume and timing of data transmission, the type of processing performed on the data, and the like. For example, a memory-mapped video I/O buffer may be tagged with a MM_IO_VBUF tag designating the caching properties of write-back cacheability with weak read/write ordering. Low-level operating system software, such as the Hardware Abstraction Language (HAL) interface of the Windows NT™ operating system or device driver software, initialize the memory regions, the cache and make symbolic associations between the memory regions and the cache. The cache, operating as directed by the memory tags, allows read and write operations that are used for performing various types of multimedia or signal processing operations including decompression, drawing operations, compression, mixing, and the like, which are performed on a virtually-cached multimedia drawing surface. The data for performing the multimedia or signal processing operations are either already located on the I/O surface or read from another storage location local to the processor or from an external processor, which is also cached and tagged as a special cached region. The processor executes operations acting on the cached data. When all operations are completely executed by the processor, only the cached memory regions are flushed using a flush instruction such as CFLSH[MM_

IO_VBUF]. The flush instruction directs the cache to write back and invalidate the regions having the designated tag, here MM_IO_VBUF.

Many advantages are attained by the described cache system and operating method. One advantage is that various types of calculations are performed in place on memory-mapped I/O buffers very quickly, reducing the time of total operations and increasing computer system performance.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE PREFERRED EMBODIMENTS

The following sets forth a detailed description of the best contemplated mode for carrying out the invention. The description is intended to be illustrative of the invention and should not be taken to be limiting.

Figure 1:
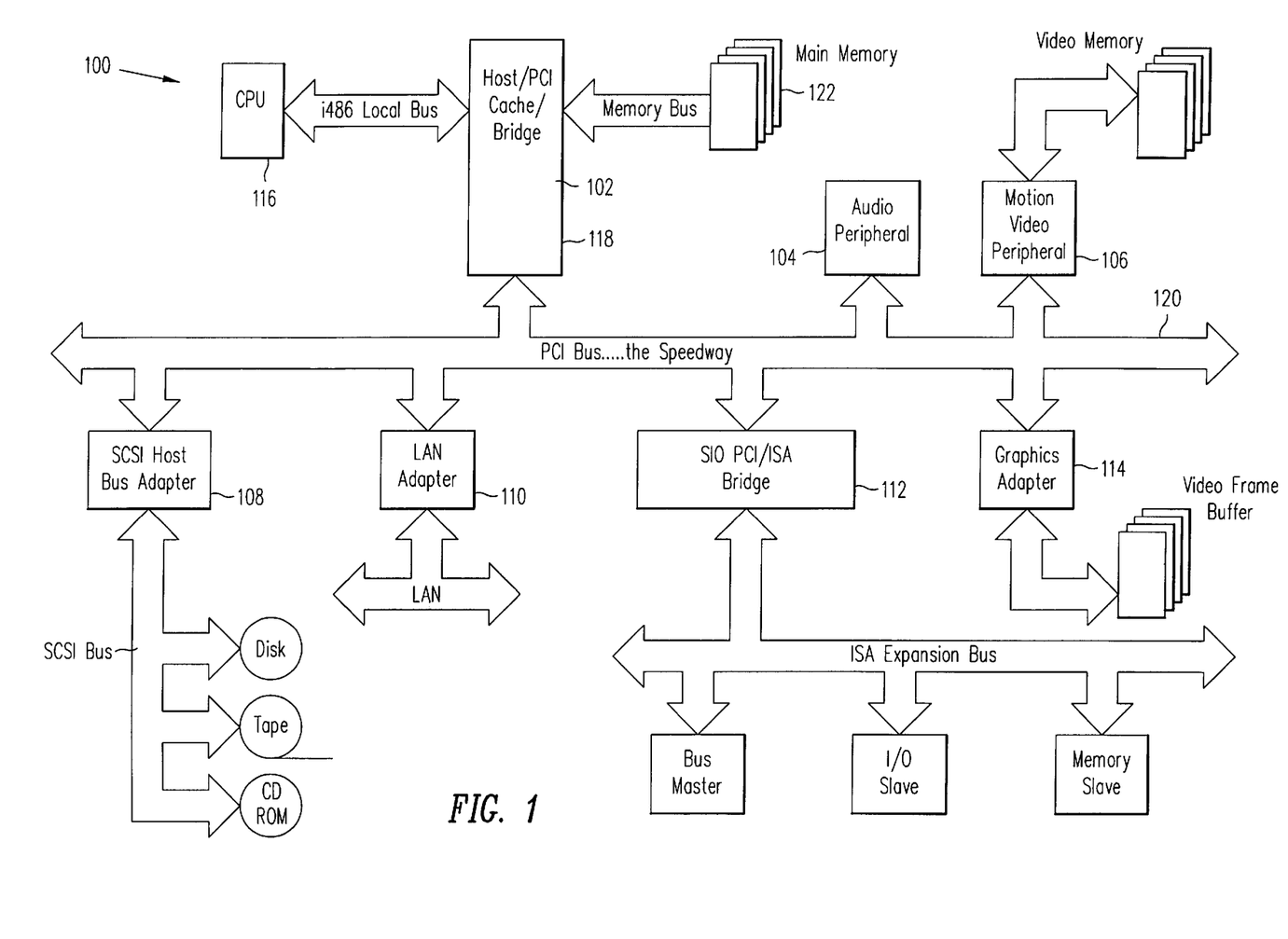
FIG. 1 is a schematic block diagram illustrating a suitable computer system for incorporating a cache memory and a plurality of memory-mapped I/O surfaces in accordance with an embodiment of the present invention.

Referring to FIG. 1, a schematic block diagram illustrates a suitable audio and video performance computer system 100 for incorporating a cache storage 102 and a plurality of memory-mapped I/O devices including an audio peripheral 104, a motion video peripheral 106, a small systems computer interface (SCSI) host bus adapter 108, a local area network (LAN) adapter 110, a serial input/output (SIO) PCI/ISA bridge 112, and a graphics adapter 114. The various memory-mapped I/O devices include regions of memory that are tagged to define region-specific cache operating characteristics, allowing for the cache strategy to be matched to the operations and functions performed by devices within the selected memory regions. Various other memory-mapped interface devices, which are known in the computing arts, may also be included in the computer system 100 and suitably tagged to define cache operating characteristics. The computer system 100 employs an architecture based on a bus, such as a PCI bus interface 120, and includes a central processing unit (CPU) 116 connected to the PCI bus interface 120 through a Host/PCI/Cache interface 118. The Host/PCI/Cache interface 118 includes the cache storage 102. The CPU 116 is connected to a main system storage 122 through the Host/PCI/Cache interface 118.

Figure 2:
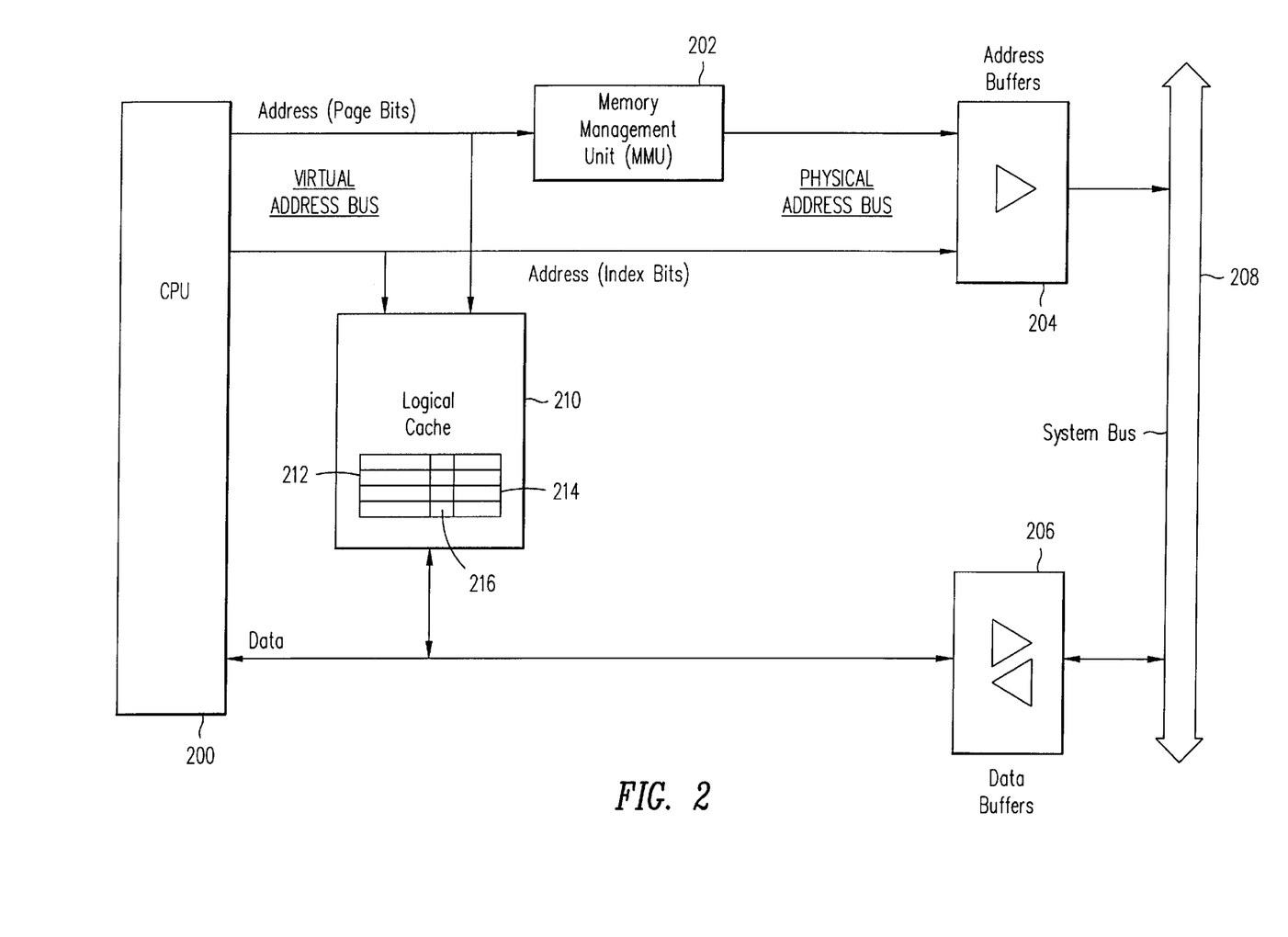
FIG. 2 is a schematic block diagram showing a suitable virtual cache structure for implementing a cache system and method using tagged cache lines for matching cache policy to I/O application.

Referring to FIG. 2, a schematic block diagram shows a suitable virtual cache structure for implementing a cache system and method using tagged cache lines for matching cache policy to I/O application. The illustrative system includes a processor 200, a memory management unit (MMU) 202, address buffers 204, data buffers 206, a system bus 208 and a virtual cache 210. The processor 200 accesses information in a main storage (not shown) connected to the system bus 208 via the virtual cache 210 and uses tagging of various regions of the main storage to define and select caching properties of transfers between the processor 200 and storage via the virtual cache 210.

The virtual cache 210 includes a cache memory 212 including a plurality of cache lines and a tag memory 214 having a plurality of tags. Each tag of the tag memory 214 corresponds to a cache line of the cache memory 212. The tags include a plurality of information fields defining a state of the corresponding cache line. A cache line is the smallest division of a cache memory for which there is a distinct tag. A cache line typically may include one or more words of cache memory. One of the information fields in the tag memory 214 is an address field 216 specifying a memory address in the memory space that is associated to the cache line at a particular time. Other information fields contain state information that is permanently stored in association with a memory region containing the memory address held in the address field 216. In this manner, the memory regions in the memory space include a tag storage holding state information pertinent to the memory region. This information is written to the tag memory 214 when the cache line is associated to the memory region.

Figure 3:
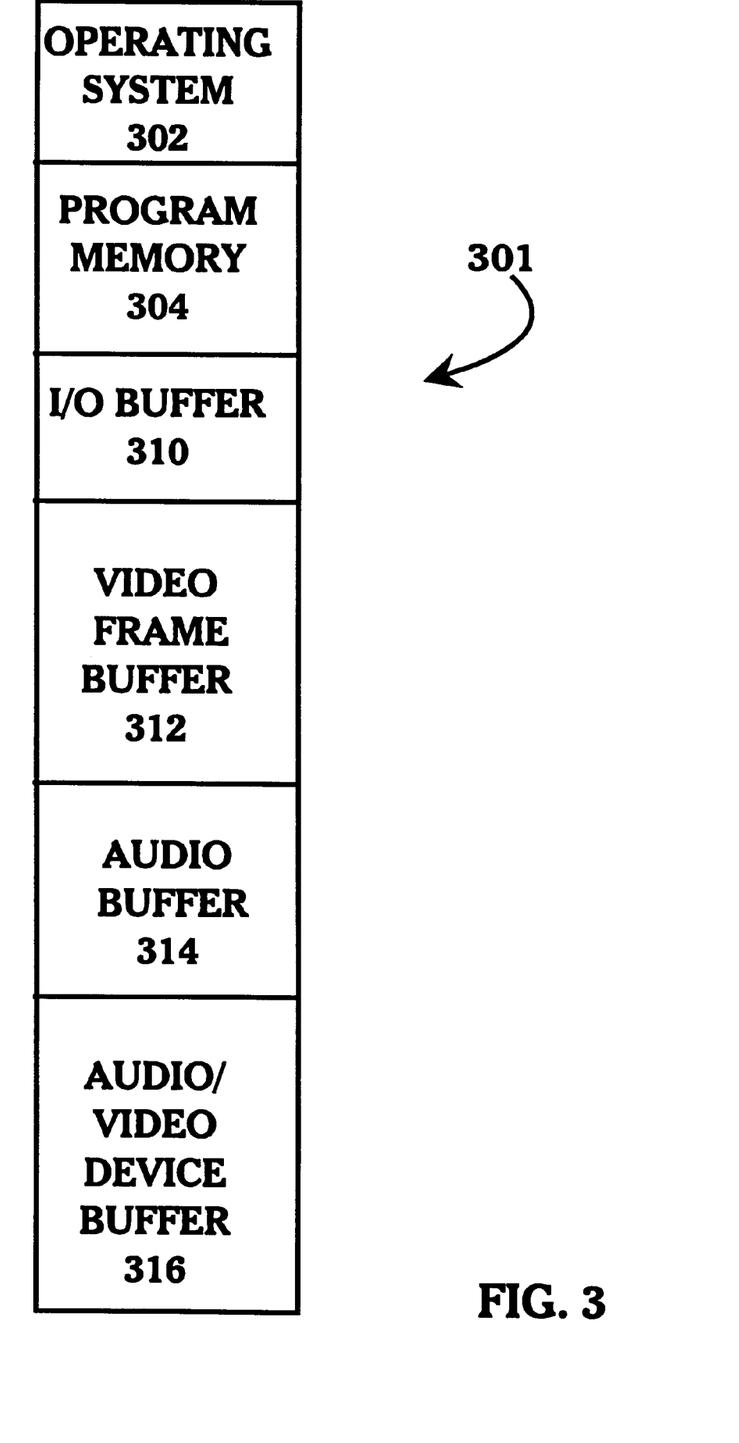
FIG. 3 is a memory map which illustrates an embodiment of a main memory made up of a plurality of memory regions.

Referring to FIG. 3, a memory map 300 is shown which illustrates an embodiment of a main memory 301 made up of a plurality of memory regions. The main memory 301 contains not only standard random access memory (RAM) and read-only memory (ROM) but also memory-mapped input/output (I/O) sources. In the illustrative example, the main memory 301 includes an operating system region 302, a program memory region 304, an I/O buffer region 310, a video frame buffer region 312, an audio buffer region 314, a high-speed audio/video device buffer 316, and the like. The various memory regions include a storage holding tag information that is transferred to the tag memory 214 shown in FIG. 2 when a cache line is associated to a memory region. The tag information is advantageously selected to improve caching and memory access performance for the particular type of information that is transferred from the particular memory region.

Typically the processor 200 performs various operations that are specific to a particular memory region. Often the algorithms, types of data, volume of data, and data handling conditions and characteristics are specific to a particular memory region. For example, the processor 200 generally performs algorithmic and computation-intensive operations such as mixing, down sampling, up sampling, cancellation, and the like on data such as audio and video data. These operations are rarely performed on information in a region such as a program memory region but are often performed on data in memory-mapped regions connected to signal sources. In addition, audio and video data is generally accessed in large buffers of data, sometimes in buffers of one megabyte or larger. When data of this volume is accessed using a conventional cache structure, locality, the principal of cache operation, is quickly destroyed. Since data handling of the different memory regions has widely variable characteristics; the specific memory regions include tag information that is written to the tag memory 214 when a cache line is associated to the memory region, thereby directing the specified caching policies so that the cache line handles the data in a manner which is favorable to the data characteristics of the memory region. Examples of caching properties, attributes and strategies that are defined and selected by the tags in the tag memory 214 include read-cacheability, write-back cacheability with strong read/write ordering, writeback cacheability with weak read/write ordering.

Figure 4:
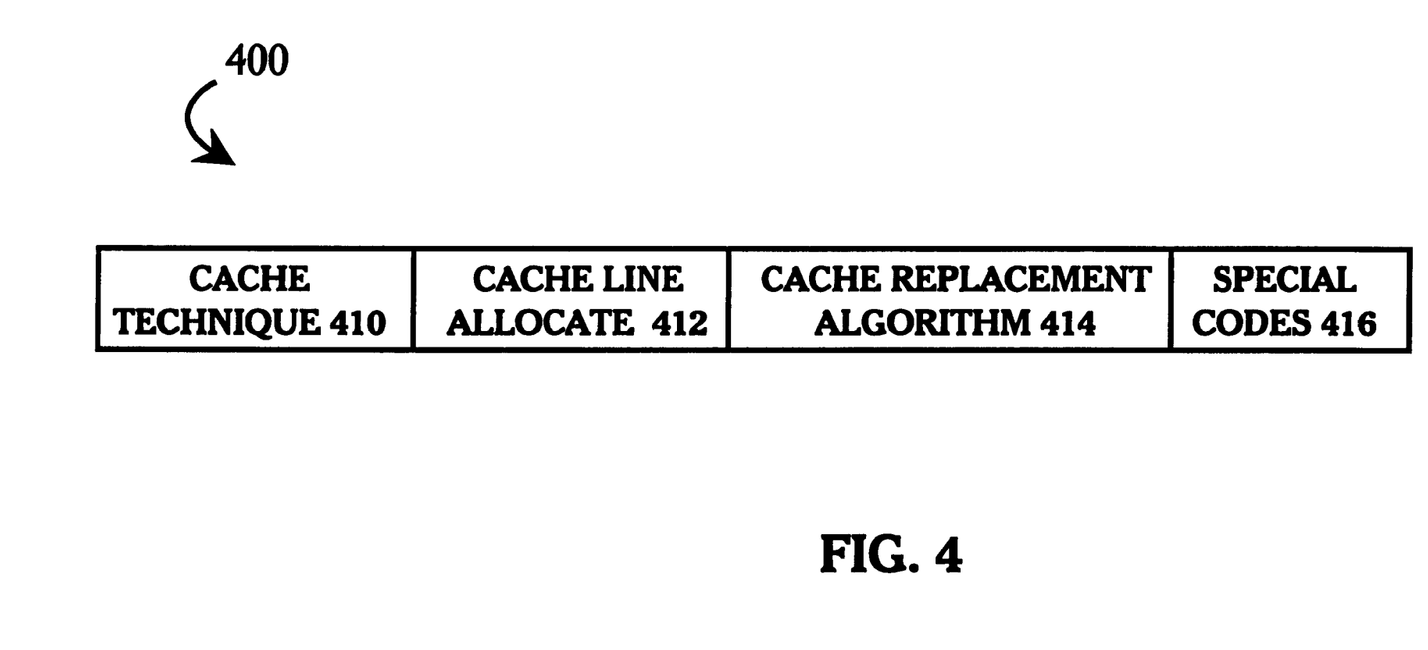
FIG. 4 shows a storage for each memory region including memory region tag information.

Referring to FIG. 4, an illustrative storage 400 for each memory region includes memory region tag information in a cache technique field 410, a cache line allocate field 412, a replacement algorithm control field 414, and a special codes field 416. The storage 400 may be located at a memory-mapped address within the memory region or may be held elsewhere, for example, in an operating system region of memory.

The cache technique field 410 is used to specify the caching technique employed for a particular memory region. For example, write-back, write-through and read-through caching techniques may be specified.

A write-through cache always updates main memory during all write cycles. Three alternative write-through caching techniques include: (1) Updating the cache if a hit occurs and the cache ignores the write cycle if a miss occurs. (2) If a miss occurs, the line is automatically invalidated. (3) A line in the cache is written whether the cycle is a hit or miss.

Using a write-back caching technique the cache does not always update the main memory but reduces main memory accesses by writing data to the cache alone at a much higher speed that data is written to main memory. Data written into a cache by the CPU is not written into main memory until the data line in cache is to be replaced. A Dirty bit is set in the cache when a location has been written. If the Dirty bit is not set, the contents of that cache location can be destroyed. Advantages of write-back caching are: (1) Write cycles are much faster since a main memory cycle is otherwise the penalty for each CPU write operation. (2) Some write cycles, such as loop counters and stack entries, are only written to main memory a fraction of the times that the CPU attempts to write the cycles. (3) The processor is on the main memory bus a lower percentage of the time. The third factor is highly important in tightly coupled multiprocessor systems where the speed of the entire system depends on the main memory bus traffic. Disadvantages of write-back caching are: (1) The processor must handle conflicts between data written to cache but not to main memory since an updated cache line must be transferred to main memory upon removal from the cache. Updating of the main memory is typically controlled using a "Dirty" bit for each cache line which designates whether a line in the cache is more current than its corresponding main memory location. The Dirty bit allows only those lines in the cache that have been modified to be written to main memory, thereby conserving a substantial amount of bus bandwidth with unnecessary write operations. Data which are written to the cache but not updated in the main memory are evicted to the main memory during replacement when the Dirty bit is set.

The cache line allocate field 412 associates a particular region of memory to a particular cache line in the cache memory 212. In various embodiments, the cache line allocate field 412 specifies operational characteristics such as characteristics controlling how the cache line is retained in the cache memory 212, controlling how the cache line is written back to memory, and preventing automatic allocation of cache lines to the memory region.

The replacement algorithm control field 414 is used to select a particular cache replacement algorithm from a plurality of implemented replacement algorithms. Implemented replacement algorithms may includes any suitable known replacement algorithms including, but not limited to, a least recently used (LRU) algorithm, a pseudo-least recently used algorithm, and a round robin replacement algorithm.

The special codes field 416 includes codes for selecting special cache operations. For example, a special code may be included for activating a filter storage operation in which a plurality of locations in the cache line are reserved for storing intermediate values determined in a filtering operation or to cache selected variables that are used repeatedly in a length computation. These storage locations are allocated and fixed in the cache memory so that, as the computation executes through a data stream, cache misses are avoided since frequently-used intermediate calculation variables are fixed in the cache memory. By avoiding cache misses and reads from main memory, performance is enhanced over the course of a lengthy computation across a data stream.

In one embodiment the cache, operating as directed by the special codes field 416, stores data for read and write operations that are used for performing various types of multimedia or signal processing operations including decompression, drawing operations, compression, mixing, and the like, which are performed on a virtually-cached multimedia drawing surface. Data for performing the multimedia or signal processing operations are either located on the I/O surface or read from another storage location local to the processor or from an external processor, which is also cached and tagged as a special cached region. The processor executes operations acting on the cached data. When all operations are completely executed by the processor, only the cached memory regions are flushed using a flush instruction such as CFLSH[MM_IO_VBUF]. The flush instruction directs the cache to write back and invalidate the regions having the designated tag, here MM_IO_VBUF.

A conventional cache has reduced performance during handling of large streams of data for signal processing applications such as multimedia applications. Reduced performance results because the large streams of data disrupt the locality principle upon which caches operate, causing thrashing as the same data is repeatedly inserted and removed from the cache.

The illustrative caching system adapts the cache to implement caching policies that are advantageous to the data handling of a particular memory region so that locality is maintained even during handling of large amounts of data, large data streams, and lengthy computations.

Figure 5:
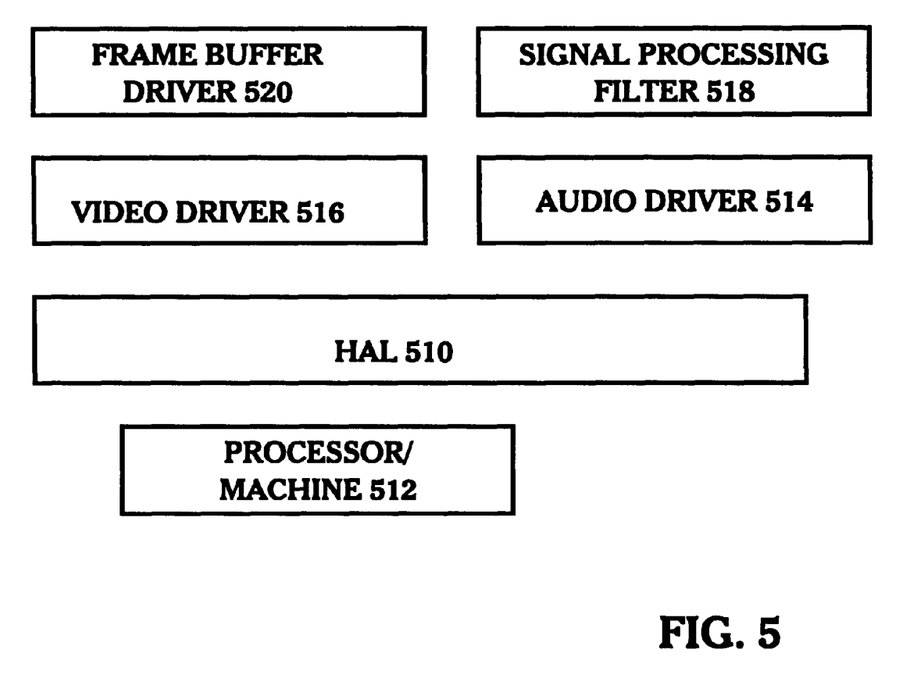
FIG. 5 is a schematic block diagram shows an organization of a low-level operating system for controlling the operations of the cache.

Referring to FIG. 5, a schematic block diagram shows an organization of a low-level operating system for controlling the operations of the cache. Low-level operating system software, such as the Hardware Abstraction Language (HAL) interface of the Windows NT™ operating system or device driver software such as a video or multimedia device driver, initializes the memory regions, the cache and make symbolic associations between the memory regions and the cache. The low-level operating system 500 includes a hardware abstraction level (HAL) 510, a processor/machine 512, and, above the HAL 510, various drivers. The drivers include an audio driver 514, a video driver 516, and a signal processing filter 518. Each of these operating system structures operates using control information accessed from tags in the various memory regions, achieving a large degree of flexibility in the operation of the operating system. Regions of system memory are dedicated to particular applications and the cache configured to most efficiently handle data for the particular applications. Drivers, such as the audio driver 514 and the video driver 516, initialize the cache as data is accessed from a specific memory region. The driver accesses the tagged information from the memory region, uses the information to determine system capabilities, and adapts the structure and operations of a cache line according to the tagged information. The information may include, for example, a base memory address, a list of attributes, user control information. The drivers then query the hardware abstraction level 510, using the tagged information to specify resource requirements. Tagging of the memory regions configures the regions for association with a particular set of caching properties. For example, a memory-mapped video I/O buffer may be tagged with a MM_IO_VBUF tag designating the caching properties of write-back cacheability with weak read/write ordering. The hardware abstraction level 510 allocates resources, for example, designating a cache line for operation as an audio buffer and another cache line for operation as a frame buffer, and designating the length of the buffers. In some embodiments, the tagged memory information specifies latency information for usage by the drivers in determining appropriate buffer sizes.

Figures 6, 6A:
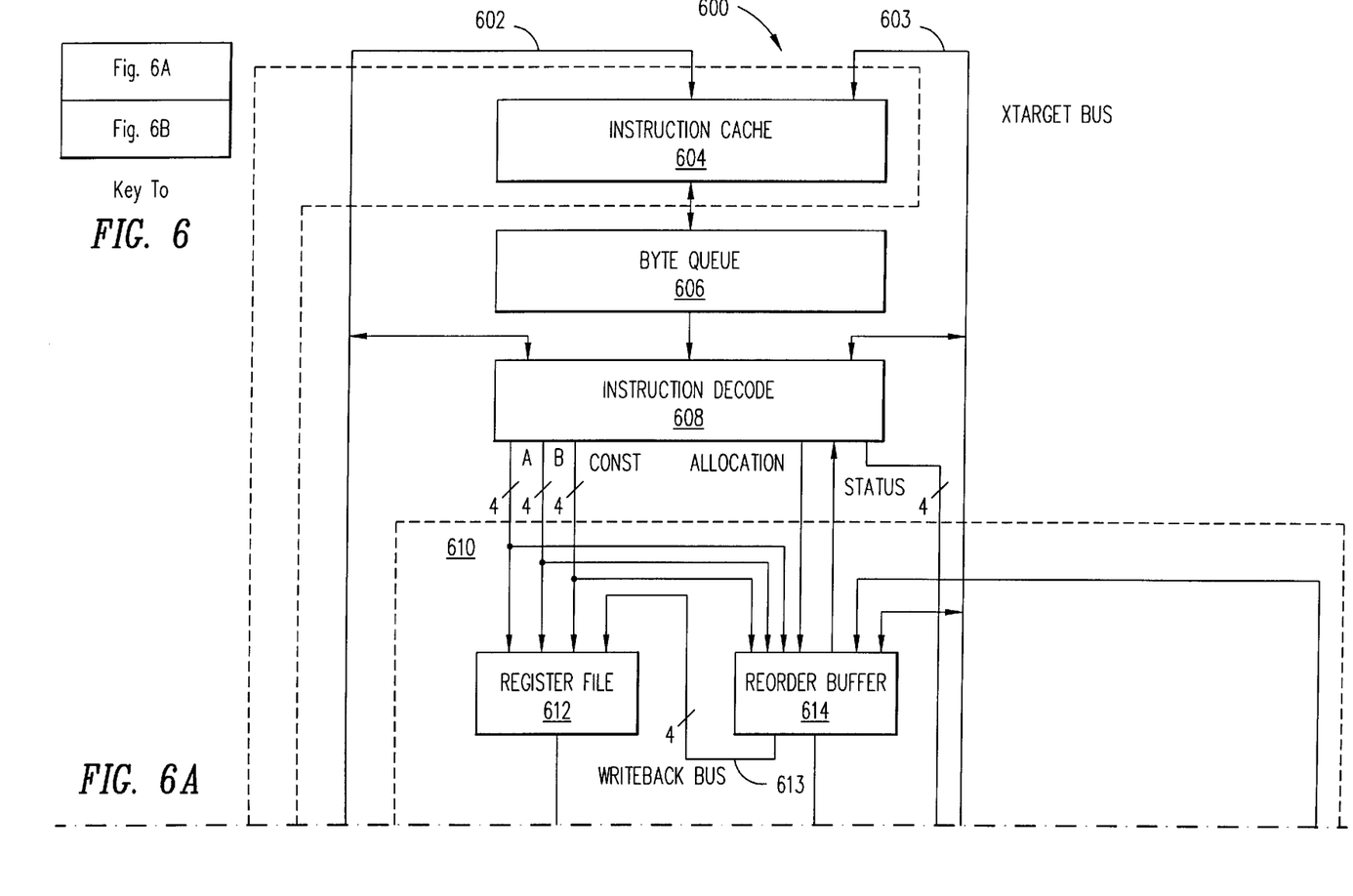
FIG. 6 is a block diagram of a microprocessor connected to a secondary cache in accordance the present invention.
Figure 6B:
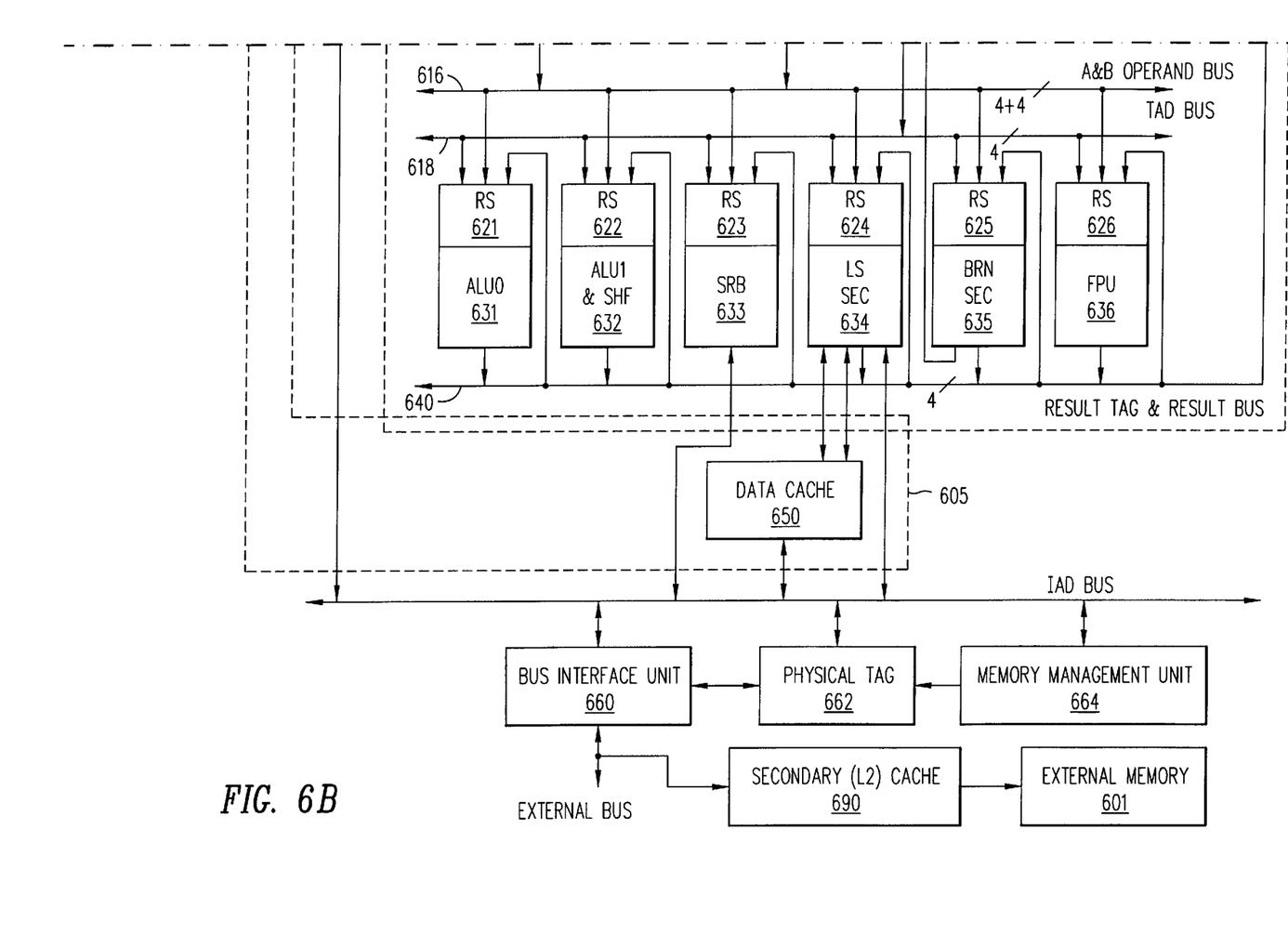

Referring to FIG. 6, a superscalar X86 microprocessor 600 executes the X86 instruction set. Microprocessor 600 is connected to physically addressed external memory 601 via a 486 XL bus or other conventional microprocessor bus. Microprocessor 600 includes a primary (L1) cache 605 incorporating an instruction cache 604 and a data cache 650. The instruction cache 604 is connected to byte queue 606 which is connected to instruction decoder 608. Instruction decoder 608 is connected to RISC core of the microprocessor 600. RISC core includes register file 612 and reorder buffer 614 as well as a variety of functional units such as shift unit 630 (SHF), arithmetic logic units 631, 632 (ALU0 and ALU1), special register block 633 (SRB), load/store unit 634 (LSSEC), branch section 635 (BRNSEC), and floating point unit 636 (FPU). The microprocessor 600 is a single VLSI chip circuit. In a circuit that is connected to the microprocessor circuit VLSI chip, a secondary (L2) cache 690 is supplied which is connected to the primary cache 605 of the microprocessor chip.

The L1 cache 605 is organized as a split data and instruction cache including an 8K byte 4-way set-associative data cache 650 and a 16K byte 4-way set-associative instruction cache 604. Both the data cache 650 and the instruction cache 604 are virtually addressed and virtually tagged to avoid translation of addresses before a cache access. A single set of physical tags is shared by both the instruction cache 604 and the data cache 650. When a change is made to the virtual-to-physical mapping of the L1 cache 605, the virtual cache tags are invalidated.

The instruction cache is organized as 1024 blocks of 16 predecoded X86 instruction bytes. The L1 cache 605 has an address tag array that is dual-ported and contains 1024 entries, each including a 20-bit linear address tag, a single valid bit designating valid status for the entire block and 16 individual byte-valid bits, one for each of the sixteen corresponding instruction bytes within the instruction store array. The data cache 650 is dual-ported and connected to dual load/store units 634 to allow two accesses to the 8K byte data cache 650 to be performed in a single clock cycle so long as no two accesses are to the same bank. Dual load/store units 634 are implemented to address a high incidence of load and store operations that typically result due to the small number of registers provided in an x86 architecture. Ports (not shown) of the data cache 650 support one or two load operations or, alternatively, one or two store operations.

The data cache 650 includes four banks and has two access ports, one for each load/store unit 634. Data accesses to different banks proceed in parallel although two accesses to the same cache bank occur in the same cycle if both accesses are applied to the same cache line.

Data cache 650 is connected to load/store functional unit 634 of the RISC core and with intraprocessor address and data (IAD) bus 602. Instruction cache 604 is also connected with IAD bus 602. The instruction cache 604 and data cache 650, in combination, form the primary (L1) cache 605 on the microprocessor chip. The primary (L1) cache 605 is connected to the secondary (L2) cache 690 which is not fabricated on the VLSI microprocessor chip. Instruction cache 604 and data cache 650 are both linearly addressable caches. Instruction cache 604 and data cache 650 are physically separate, however, both caches are organized using the same architecture. Microprocessor 600 also includes a physical tag circuit 662. Physical tag circuit 662 interacts with both instruction cache 604 and data cache 650 via the IAD bus.

RISC core 610 includes A and B operand buses 616, type and dispatch (TAD) bus 618 and result bus 640 which are connected to the functional units as well as displacement and instruction, load store (INLS) bus 619 which is connected between instruction decoder 608 and load/store unit 634. A and B operand buses 616 are also connected to register file 612 and reorder buffer 614. TAD bus 618 is also connected to instruction decoder 608. Result bus 640 is also connected to reorder buffer 614. Additionally, branch section 635 is connected to reorder buffer 614, instruction decoder 608 and instruction cache 604 via Xtarget bus 603. A and B operand buses 616 includes four parallel 41-bit wide A operand buses and four parallel 41-bit wide B operand buses as well as four parallel 12-bit wide A tag buses, four parallel 12-bit wide B tag buses, a 12-bit wide A tag valid bus a 12-bit wide B tag valid bus, four 4-bit wide destination tag buses and four 8-bit wide opcode buses. Type and dispatch bus 618 includes four 3-bit wide type code buses and one 4-bit wide dispatch buses. Displacement and INLS bus 619 includes two 32-bit wide displacement buses and two 8-bit wide INLS buses.

Microprocessor 600 also includes memory management unit (MMU) 664 and bus interface unit 660 (BIU). TLB 664 is connected with the IAD bus and physical translation circuit 662. Bus interface unit 660 is connected to physical translation circuit 662, data cache 650 and IAD bus 602 as well as an external microprocessor bus such as the 486 XL bus.

Microprocessor 600 executes computer programs which include sequences of instructions. Computer programs are typically stored on a hard disk, floppy disk or other non-volatile storage media, such as a BIOS ROM, which are located in the computer system. When the program is run, the program is loaded from the storage media into main memory 601. Once the instructions of the program and associated data are in main memory 601, individual instructions are prepared for execution and ultimately executed by microprocessor 600.

After being stored in main memory 601, the instructions are passed via bus interface unit 660 to instruction cache 604, where the instructions are temporarily held. The x86 instructions are provided by instruction cache 604 to instruction decoder 608 using a fetch program counter value which is generated by instruction cache 604.

Figure 7:
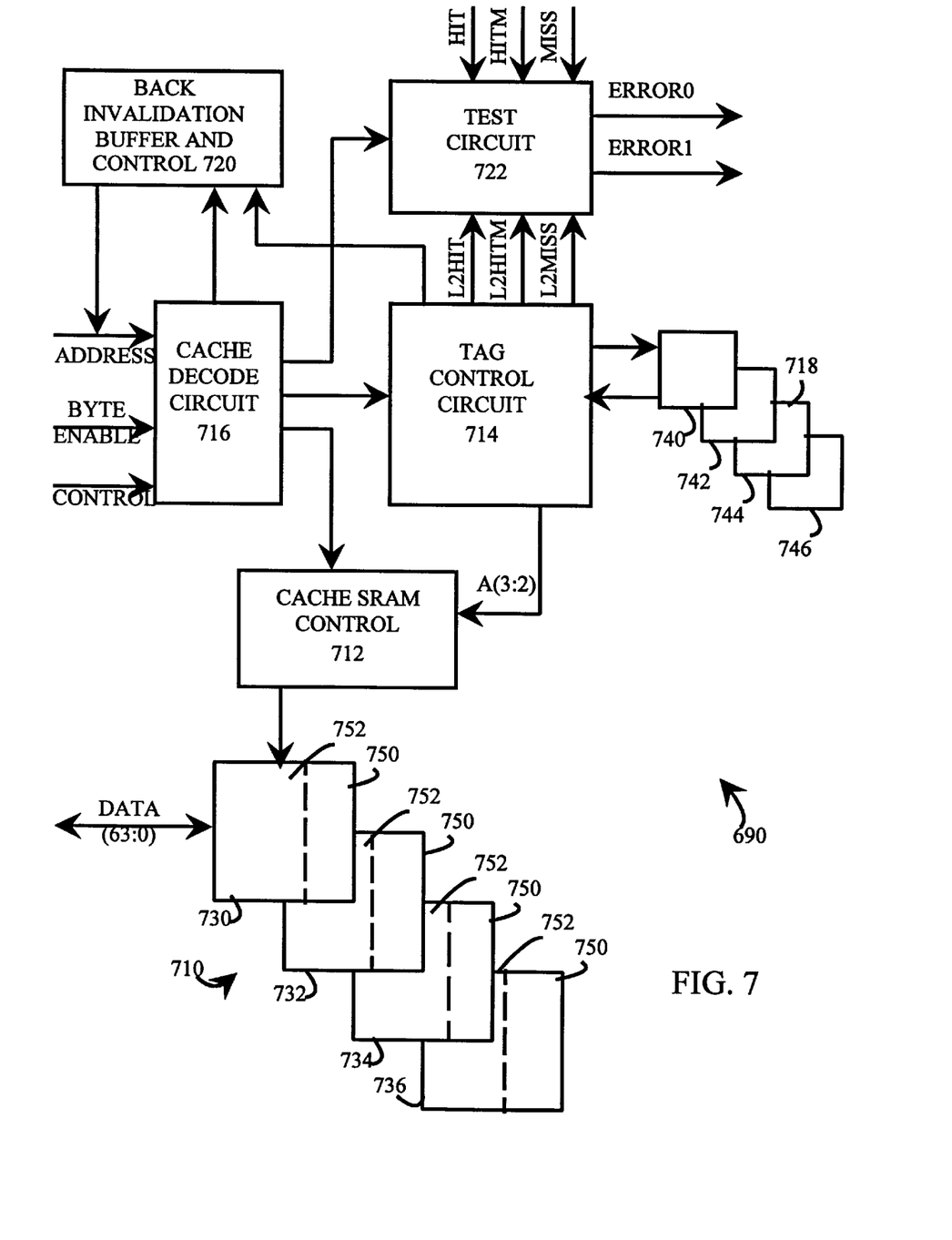
FIG. 7 is a block diagram which illustrates the functional and structural blocks of a secondary cache in accordance with the present invention.

Referring to FIG. 7, the secondary (L2) cache 690 includes a static random access memory (SRAM) data and code memory 710, a cache SRAM control circuit 712, a tag control circuit 714, a cache decode circuit 716, a cache tag memory 718, a back invalidation buffer and control circuit 720 and a replacement algorithm select circuit 760. Like the L1 cache 605, the L2 cache 690 is organized as a split data and instruction cache including an 8K byte 4-way set-associative data cache 650 and a 16K byte 4-way set-associative instruction cache 604. The line size of the L2 cache 690 is 16 bytes, matching the line size of the L1 cache 605. Both the L1 cache 605 and L2 cache 690 maintain coherency line by line through snooping, inclusion of contents of the L1 cache 605 into L2 cache 690 storage. L1 cache 605 invalidates are limited through usage of inclusion. According to the inclusion method, the L2 cache 690 directory is used to prescreen invalidation cycles before the cycles are passed to the smaller L1 cache. Accordingly, the contents of the L1 cache are always a subset of the contents of the L2 cache.

Characteristics of the L1 cache 605 greatly influence the operations of the L2 cache 690. For example, the 8K byte 4-way set-associative data cache 650 and a 16K byte 4-way set-associative instruction cache 604 greatly reduce the number of external read cycles seen by the L2 cache 690 and the main memory 601. Accordingly, the processor external bus cycles are more likely to be write cycles than read cycles.

The L2 cache 690 is a split, 4-way set associative look-aside cache. The L2 cache 690 operates under the control of the processor. The L2 cache 690 sets a read condition as a default condition for the next processor cycle. The cycle therefore begins by enabling data RAM output signals onto the data bus. These RAM output signals are disabled under two conditions. First, when the processor W/R# output signal is high, indicating a requested write cycle. Second, during a read cycle after the cache-tag RAM detects a miss or a cycle to a noncacheable address. In the case of a cache hit, the cache-tag RAM and the tag control circuit 714 signify that the cache data is ready using a burst ready input signal so that the processor can continue the write operation. In the case of a cache miss, the processor is stalled and the cache data RAM is disabled from placing data onto the data bus. If the L2 cache 690 contains a valid copy of data or code requested by the processor during a processor read cycle, then the L2 cache 690 allows the processor to perform at the speed of the L2 cache 690. If the L2 cache 690 does not contain a copy of the data or code, then the L2 cache 690 initiates a read cycle of the main memory. The L2 cache 690 then copies the data or code supplied by the main memory and allows the processor to continue execution. Data or code accessed by the processor is routed by the cache SRAM control circuit 712 from the SRAM data and code memory 710 for a cache hit and otherwise from the main memory in the case of a cache miss. Accordingly, the L2 cache 690 intercepts input and output signals of the processor and determine whether these signals are to be applied to the main memory or retained local to the L2 cache 690. For a look-aside cache, the address designated by the processor propagates through the address buffers to the bus at the beginning of all cycles, whether the cycle is a read hit or a read miss cycle. A look-aside cache strategy allows a cache to be removed or inserted into a computer system with no effects other than performance. Main memory transactions are initiated before a cache hit or miss is detected and are aborted if a cache hit occurs. The look-aside L2 cache 690 initiates a main memory access synchronously with the SRAM data and code memory 710 access, rather than waiting for a cache miss before requesting a main memory access. In this manner, the main memory access time is reduced in the event of a cache miss.

A read miss cycle occurs when the contents of the cache tag memory 718 do not match the address directed by the processor. In this case, L2 cache 690 output signals to the data bus DATA(63:0) are terminated and data from the main memory is allowed to be transferred to the processor.

In a write operation, information is written to the L2 cache 690 for immediate or subsequent modification of the main memory. The L2 cache 690 implements a write-once protocol in which the processor must write to a main memory location once before the processor can maintain exclusive use of that location. During this write cycle, the address of the location is invalidated in all other caches. This exclusive use is terminated when another processor attempts to read that location from main memory. Whether the write to main memory is immediate or subsequent is determined by an implemented write policy. A write-through write policy involves writing data from the processor to both the cache and main memory simultaneously to assure coherency. In a copy-back write policy, data written into cache by the processor is not written into main memory until a data line in cache is to be replaced. A line is the smallest division of a cache memory that is labeled using a distinct tag.

A data transfer cycle is terminated by an external assertion of either the ready RDY# or burst ready BRDY# input signals to the processor. Either or both of these signals are used to signify the presence of valid data and the end of the transfer cycle. The absence of either the ready RDY# or burst ready BRDY# input signal causes the processor to enter a WAIT state until the rising edge where one of these signals is sampled active.

The SRAM data and code memory 710 is a small and fast memory for storing replicas of instructions and data that, if accessed directly from a main memory, would generally be accessed more slowly. The SRAM data and code memory 710 is connected to receive control signals from the cache SRAM control circuit 712 and is connected to the data bus DATA(63:0) to form a data path for transferring data and code among the L2 cache 690, the L1 cache 605 and the main memory 601. The SRAM data and code memory 710 is readable in the manner of a block of main memory at a predetermined main memory address. The readable nature of memory in the L2 cache 690 allows test software to be written which compares information in the SRAM data and instruction memory 710, including states of a line of cache memory, to information held in the L1 cache 605. The L1 cache 605 similarly allows data and instruction memory to be accessed through software calls to special registers and a data port to read out data in the tag and data arrays of the L1 cache 605 to accommodate this comparison. SRAM data and code memory 710 has 64K sets with four 16-byte ways (also called banks) per set. Each of the four ways are substantially identical. The L2 cache 690 is a 4-way set-associative cache that uses four cache data RAM ways 730, 732, 734 and 736 in the SRAM data and code memory 710.

The cache SRAM control circuit 712 implements a control algorithm which controls transfer of data and code among the SRAM data and code memory 710, the L1 cache 605 and the main memory 601 and further controls transfer of addresses among the cache tag memory 718, the L1 cache 605 and the main memory 601. The cache SRAM control circuit 712 implements the cache strategy of the L2 cache 690 and determines timing for reading to and from the SRAM data and code memory 710 and the cache tag memory 718.

The tag control circuit 714 determines cache status and initiates control of the cache in response to the cache status. In particular, tag control circuit 714 determines whether a cache hit or miss cycle is occurring and, for a cache hit cycle, whether the hit occurs on a modified cache line. In response to this determination, the tag control circuit 714 sets signals on the L2HIT#, L2HITM# and MISS lines. The tag control circuit 714 applies control lines to the cache SRAM control circuit 712 that select the designated way upon which the cache access is directed. The tag control circuit 714 initiates timing cycles, generates write enable signals, tag select signals and chip enable signals, controls transmission of these signals to the SRAM data and code memory 710 and applies the tag portion of the address to the cache tag memory 718. The tag control circuit 714 implements a line replacement algorithm. Furthermore, the tag control circuit 714 also determines which line is to be replaced using a designated replacement algorithm.

During a snoop hit cycle, a main memory bus transaction occurs to an address that is replicated in the cache. An extended address is applied to the tag control circuit 714 to determine whether the address is presently contained in the L2 cache 690 and, if so, to determine whether the addressed data is valid. If no valid line is contained in the cache tag memory 718, the tag control circuit 714 generates a signal on the MISS# line. If a modified line is contained in the cache tag memory 718, the tag control circuit 714 generates a signal on the HITM# line. If a valid line, which is not modified, is contained in the cache tag memory 718, the tag control circuit 714 generates a signal on the HIT# line. These signals are analyzed to determine whether an error occurs on a cache cycle.

The tag control circuit 714 controls a replacement algorithm to select which of the four cache data RAM ways 730, 732, 734 and 736 is replaced when a line is updated. One replacement algorithm is a least recently used (LRU) algorithm, in which the cache SRAM control circuit 712 monitors accesses of each cache line of L2 cache 690, determines the order of accesses and classifies this order. The way that is classified as being accessed least recently is selected for replacement.

A related replacement algorithm is a pseudo-least recently used (pseudo-LRU) method, which utilizes three bits per cache line to monitor cache accesses. A first bit is used to monitor accesses to the upper half ways 734 and 736 with respect to the lower half ways 730 and 732. The first bit is asserted, for example, when the most recent access strikes the upper half ways 734 and 736. The first bit is deasserted when the most recent access strikes the lower half ways 730 and 732. A second bit is included to monitor accesses to the upper quarter way 736 with respect to the third quarter way 734. The second bit is asserted when an access strikes the upper quarter way 736 and is deasserted when an access strikes the third quarter way 734. The second bit is updated only when the first bit is asserted. A third bit is included to monitor accesses to the lower quarter way 730 with respect to the second quarter way 732. The third bit is asserted when an access strikes the second quarter way 732 and is deasserted when an access strikes the lower quarter way 730. The third bit is updated only when the first bit is asserted.

An alternative replacement algorithm is a random replacement technique in which the way to be replaced is randomly selected.

A further alternative replacement algorithm is a not last used (NLU) method which utilizes a pointer that points to the most recently used way. The pointer stores a copy of the number of the way that was last accessed for any particular set address. The concept of the NLU method is that random selection is generally suitable but is improved by avoiding random selection of the last-used way for a set address since that way is the most likely way to be accessed.

The efficiency and performance of a cache utilizing different cache policies typically is highly dependent on the software that is run. It is advantageous for various different policies to be implemented in a cache so that a maximally efficient cache policy is selected for running a particular software routine. It is additionally advantageous for the cache to automatically select a maximally advantageous cache policy during the execution of various software routines.

The replacement algorithm select circuit 760 is connected to the tag control circuit 714 and supplies control signals that direct the tag control circuit 714 to replace a particular line. The replacement algorithm select circuit 714 is connected to a replacement algorithm control register 762 via a control line. The replacement algorithm control register 762 is positioned at an I/O location that is accessible to software and is programmed to select one of a plurality of replacement algorithms. In one embodiment, the replacement algorithm select circuit 760 is constructed from field programmable gate arrays (FPGA) as a portion of the secondary cache circuit.

One embodiment, the pseudo least recently used algorithm is implemented using software that controls the replacement algorithm select circuit 760. The replacement algorithm select circuit 760 is connected to several LRU bit lines to receives three lines that correspond to three input data bits and three output data lines. These lines are controlled so that, each time a cache line is replaced or read, the replacement algorithm select circuit 760 reads the LRU lines to determine which line to replace. The replacement algorithm select circuit 760 replaces the specified line to implement the algorithm.

The cache decode circuit 716 is connected to the microprocessor 600 via extended address (EADS#) lines, byte enable lines and control lines. The cache decode circuit 716 accesses memory address signals, data, byte enable signals and miscellaneous control signals for the L2 cache 690 at a rising edge of the clock which drives microprocessor timing. The cache decode circuit 716 determines the type of cache cycle that is driving the caches. The basic cache cycles include cache read hit, cache read miss, tag read and memory read cycles. In a cache read miss cycle, the microprocessor requests caching of a particular line in main memory 601 that is not currently in the cache. For example in the cache read miss cycle, the cache decode circuit 716 sends a signal to the SRAM data and code memory 710 via the cache SRAM control circuit 712 and sends a signal to the tag control circuit 714 to control storing of data from the main memory 601 into the SRAM data and code memory 710. The tag control circuit 714 responds to the cache read miss signal by initiating timing cycles, generating write enable signals, tag select signals and chip enable signals, controlling transmission of these signals to the SRAM data and code memory 710 and applying the tag portion of the address to the cache tag memory 718. The cache SRAM control circuit 712 awaits burst ready (BRDY#) signals from the microprocessor 600. With each BRDY# signal, the cache SRAM control circuit 712 writes a timing signal to the particular way that is being accessed. The way that is accessed is selected in accordance with a particular replacement algorithm that is implemented in the tag control circuit 714. The tag control circuit 714 applies control lines to the cache SRAM control circuit 712 that select the designated way upon which the cache access is directed. Thus, the same way in the SRAM data and code memory and in the cache tag memory 718 are accessed simultaneously.

In another example, the cache read hit cycle occurs as the microprocessor 600 requests a line that is cacheable but does not exist in the L2 array 690. The tag control circuit 714 responds to the cache read hit signal by simply acknowledging the read hit on the L2HIT# line. The cache SRAM control circuit 712 responds to the cache read hit signal by activating the SRAM data and code memory 710 to transfer data back to the microprocessor 600 at high speed.

The cache tag memory 718 serves as a cache directory and contains a list of the main memory addresses of the data and instruction code that is stored in corresponding locations of the SRAM data and code memory 710. Thus for each location in SRAM data and code memory 710, not only is a data or code stored in the SRAM data and code memory 710 but also an address is stored in the cache tag memory 718. The cache tag memory 718 is most basically described as a static RAM (SRAM) memory where the actual main memory address is stored. The cache tag memory 718 is addressed in a manner that is similar to page addressing in which a memory index is received that corresponds to upper address bits. Other data stored in the cache tag memory 718 includes lower address bits for a line. In one embodiment, all 32 bits of a microprocessor address are received by the tag control circuit 714 for storage in the cache tag memory 718. Least significant bits <3:0> are ignored, middle bits <13:4> are used as compare address and most significant bits <31:14> designate an address. The tag control circuit 714 compares the compare address that is applied to the L2 cache 690 to the compare address that is stored in the cache tag memory 718 that is stored at a particular address. If the compare addresses are the same, a cache hit results. The cache tag memory 718 is connected to receive control signals from the tag control circuit 714. Like the SRAM data and code memory 710, the cache tag memory 718 is readable. The L1 cache 105 similarly allows data and instruction tags to be accessed through software calls to special registers to provide for this comparison. Accordingly, both the data and code in the SRAM data and code memory 710 and the addresses in the cache tag memory 718 are readable in the manner of a block of main memory at a predetermined main memory address.

The cache tag memory 718 is a 4-way set associative cache so that each tag has three portions including a tag, an index and a block offset. The index represent a set address which selects the set of the 64K sets in the SRAM data and code memory 710. The tag is the remainder of the address generated by the processor after the set bits are removed. Tag bits of the address are compared with tag bits of the cache tag memory 718 which are stored at the same address. If the tags match, then data or code stored within the SRAM data and code memory 710 at the same address represent the contents of the main memory location that is accessed. Because the L2 cache 690 is a 4-way set-associative cache, four cache tag RAM ways 740, 742, 744 and 746 are included in the cache tag memory 718.

The back invalidation buffer and control circuit 720 is used for replacement following a cache miss. Following a cache miss, the tag control circuit 714 determines which line is to be replaced using a designated replacement algorithm. The tag control circuit 714 selects the way to be replaced and directs that data in the way to be replaced, since the data is valid data, is transferred to the back invalidation buffer and control circuit 720. At the same time, the tag control circuit 714 directs that the upper address bits of the replaced way are transferred from the cache tag memory 718 to the back invalidation buffer and control circuit 720. When the buffer in the back invalidation buffer and control circuit 720 is full, the circuit 720 asserts a hold signal to the microprocessor 600. The microprocessor 600 subsequently returns a hold acknowledge signal, to which the back invalidation buffer and control circuit 720 responds by returning a start address and EADS# to the microprocessor 600. If the line stored in the back invalidation buffer and control circuit 720 is a modified line, the microprocessor 600 performs a write operation to memory to store the line, as modified. If the line is not modified, it is simply invalidated and not written to memory. In this manner, coherency between the L1 cache 105, the L2 cache 690 and the main memory 601 is maintained.

In one embodiment, the buffer of the back invalidation buffer and control circuit 720 is only one line deep. Typically, the buffer would be several lines deep.

Signals on the HIT# and HITM# pins reflect results of L1 cache 605 operations that take place during a particular clock cycle, the inquire cycle, of the microprocessor. An inquire cycle is initiated by the microprocessor to determine whether a line is present in the instruction or data cache and the state of the line. An inquire cycle is driven to the microprocessor when a bus master other than the microprocessor initiates a read or write bus cycle. An inquire cycle is driven to the microprocessor when the bus master initiates a read to determine whether the data cache 650 contains the latest information. If a snooped line is in the data cache 650 in a modified state, the microprocessor has the most recent information and is to schedule a writeback of data to the main memory 601. An inquire cycle is driven to the microprocessor when the other bus master initiates a write to determine whether the microprocessor instruction cache 604 or data cache 650 contains the snooped line and to invalidate the line if the line is present.

The microprocessor sets a hit HIT# indication signal to designate the outcome of an inquire cycle. If an inquire cycle hits a valid line in either the instruction cache 604 or the data cache 650 of the L1 cache 605, the HIT# pin is asserted two clocks after an EADS# signal is sampled asserted. The EADS# signal indicates that a valid external address has been driven onto the processor address pins which are used for an inquire cycle. If the inquire cycle misses the L1 cache 605, the HIT# pin is deasserted two clocks after an EADS# signal is sampled asserted. The HIT# pin is modified only as a result of an inquire cycle and holds a value between inquire cycles.

The microprocessor sets a hit modified line HITM# indication signal to designate the outcome of an inquire cycle. The HITM# indication signal is asserted after inquire cycles that resulted in a hit to a modified line in the data cache 650 of the L1 cache 605. The HITM# bit is used to inhibit another bus master from accessing the data until the line is completely written back to the main memory 601.

While the invention has been described with reference to various embodiments, it will be understood that these embodiments are illustrative and that the scope of the invention is not limited to them. Many variations, modifications, additions and improvements of the embodiments described are possible. For example, although the embodiments shown in FIGS. 6 and 7 relate to tagging within a secondary (L2) cache, the described system and method is also applicable to tagging within both a first level (L1) cache and a secondary cache (L2) cache. Furthermore, any suitable caching strategy or policy may be tagged in this manner.

What is claimed is:

1. A computing apparatus comprising:
    a processor;
    a cache coupled to the processor;
    a bus coupled to the cache;
    a plurality of variable-characteristic memory regions external to the cache and coupled to the cache via the bus, the variable-characteristic memory regions having variable data characteristics selected from among data flow rates, data volumes, and data processing characteristics;
    a tag memory including a plurality of memory region tags associated to ones of the plurality of variable-characteristic memory regions, the memory region tags independently tagging cache characteristics of the plurality of memory regions according to a character of data in the variable-characteristic memory regions;
    a memory region tag of the plurality of memory region tags configuring a cache line to include a plurality of storage locations holding filter coefficients continuously while other storage in the cache line is periodically replaced.

2. A computing apparatus according to claim 1 further comprising:
    an operating system executable on the processor and including a routine configuring the cache to the cache characteristics of a selected memory region including configuring symbolic associations.

3. A computing apparatus according to claim 2 wherein:
    the operating system includes a hardware abstraction level of a Windows NT™ operating system including the cache configuring routine.

4. A computing apparatus according to claim 2 wherein:
    the operating system includes a device driver including the cache configuring routine.

5. A computing apparatus according to claim 1 further comprising:
    a memory-mapped video I/O buffer coupled to the bus and having an address mapped to one of the plurality of memory regions.

6. A computing apparatus according to claim 5 wherein:
    the memory-mapped video I/O buffer has an associated memory region tag that tags the memory-mapped video I/O buffer with a cache characteristic of writeback cacheable with weak read-write ordering.

7. A computing apparatus according to claim 1 further comprising:
    a memory region tag of the plurality of memory region tags allocating a memory region to a cache line.

8. A computing apparatus according to claim 1 further comprising:
    a memory region tag of the plurality of memory region tags configuring a cache replacement strategy to a selected memory region.

9. A computing apparatus according to claim 1 further comprising:
    a memory region tag of the plurality of memory region tags configuring a cache line size to a cache line allocated to a selected memory region.

10. A computing apparatus according to claim 1 wherein:
    the memory region tags independently tag cache characteristics of the plurality of memory regions according to a character of data in the variable-characteristic memory regions including data locality, volume and timing of data transmission, and type of processing performed on the data.

11. A method of operating a computing apparatus including a processor, a cache couple to the processor, a bus coupled to the cache, a plurality of variable-characteristic memory regions external to the cache and coupled to the cache via the bus, and a tag memory, the method comprising:
    independently tagging ones of the plurality of variable-characteristic memory regions in the tag memory to define cache characteristics according to a characteristics of data of the plurality of variable-characteristic memory regions, the data having variable data characteristics selected from among data flow rates, data volumes, and data processing characteristics;
    selecting a memory region of the plurality of variable-characteristic memory regions for supplying information for execution by the processor; and configuring the cache as directed by the tagging of the selected memory region;
    tagging a selected memory region of the plurality of memory regions to configure a cache line to include a plurality of storage locations for holding filter coefficients continuously while other storage in the cache line is periodically replaced; and
    configuring a cache line to include a plurality of storage locations holding filter coefficients continuously while other storage in the cache line is periodically replaced.

12. A method according to claim 11 wherein the computing apparatus further includes a memory-mapped video I/O buffer coupled to the bus and having an address mapped to one of the plurality of memory regions, the method further comprising:
    tagging the memory-mapped video I/O buffer with a cache characteristic of writeback cacheable with weak read-write ordering.

13. A method according to claim 11 further comprising:
    tagging a selected memory region of the plurality of memory regions to allocate a memory region to a cache line; and
    allocating a memory region to a cache line.

14. A method according to claim 11 further comprising:
    tagging a selected memory region of the plurality of memory regions to configure a cache replacement strategy to a selected memory region; and
    configuring a cache replacement strategy to a selected memory region.

15. A method according to claim 11 further comprising:
    tagging a selected memory region of the plurality of memory regions to configure a cache line size to a cache line allocated to a selected memory region; and
    configuring a cache line size to a cache line allocated to a selected memory region.

16. A software computer program comprising a plurality of executable routines executing a method of operating a computing apparatus including a processor, a cache coupled to the processor, a plurality of variable-characteristic memory regions external to the cache and coupled to the cache, and a tag memory, the method comprising:
    providing a tag memory including a plurality of memory region tags associated to ones of the plurality of variable-characteristic memory regions;
    independently tagging ones of the plurality of variable-characteristic memory regions in the tag memory to define cache characteristics according to a character of data of the plurality of variable-characteristic memory regions, the variable-characteristic memory regions having variable data characteristics selected from among data flow rates, data volumes, and data processing characteristics;

selecting a memory region of the plurality of variable-characteristic memory regions for supplying information for execution by the processor, and configuring the cache as directed by the tagging of the selected memory region;

providing a memory region tag of the plurality of memory region tags configuring a cache line to include a plurality of storage locations holding filter coefficients continuously while other storage in the cache line is periodically replaced.

17. A computer program product comprising a computer usable medium having computable readable code embodied therein including a plurality of executable routines executing a method of operating a computing apparatus including a processor, a cache coupled to the processor, a plurality of variable-characteristic memory regions external to the cache and coupled to the cache, and a tag memory, the method comprising:

providing a tag memory including a plurality of memory region tags associated to ones of the plurality of variable-characteristic memory regions;

independently tagging ones of the plurality of variable-characteristic memory regions in the tag memory to define cache characteristics according to a character of data of the plurality of variable-characteristic memory regions, the variable-characteristic memory regions having variable data characteristics selected from among data flow rates, data volumes, and data processing characteristics;

selecting a memory region of the plurality of variable-characteristic memory regions for supplying information for execution by the processor; and configuring the cache as directed by the tagging of the selected memory region;

providing a memory region tag of the plurality of memory region tags configuring a cache line to include a plurality of storage locations holding filter coefficients continuously while other storage in the cache line is periodically replaced.

18. A method of providing a computing apparatus comprising:

providing a processor;

providing a cache coupled to the processor;

providing a bus coupled to the cache;

providing a plurality of variable-characteristic memory regions coupled to the cache via the bus, the variable-characteristic memory regions having variable data characteristics selected from among data flow rates, data volumes, and data processing characteristics;

providing a tag memory including a plurality of memory region tags associated to ones of the plurality of variable-characteristic memory regions, the memory region tags independently tagging cache characteristics of the plurality of memory regions according to a character of data in the variable-characteristic memory regions;

providing a memory region tag of the plurality of memory region tags configuring a cache line to include a plurality of storage locations holding filter coefficients continuously while other storage in the cache line is periodically replaced.

19. A method according to claim 18 further comprising:

providing an operating system executable on the processor and including a routine configuring the cache to the cache characteristics of a selected memory region including configuring symbolic associations.

20. A method according to claim 19 wherein:

the operating system includes a hardware abstraction level of a Windows NT™ operating system including the cache configuring routine.

21. A method according to claim 19 wherein:

the operating system includes a device driver including the cache configuring routine.

22. A method according to claim 18 further comprising:

providing a memory-mapped video I/O buffer coupled to the bus and having an address mapped to one of the plurality of variable-characteristic memory regions.

23. A method according to claim 22 wherein:

the memory-mapped video I/O buffer has an associated memory region tag that tags the memory-mapped video I/O buffer with a cache characteristic of writeback cacheable with weak read-write ordering.

24. A method according to claim 18 further comprising:

providing a memory region tag of the plurality of memory region tags allocating a memory region to a cache line.

25. A method according to claim 18 further comprising:

providing a memory region tag of the plurality of memory region tags configuring a cache replacement strategy to a selected memory region.

26. A method according to claim 18 further comprising:

providing a memory region tag of the plurality of memory region tags configuring a cache line size to a cache line allocated to a selected memory region.

* * * * *